(12) United States Patent
Kulkarni

(10) Patent No.: US 9,869,595 B2
(45) Date of Patent: Jan. 16, 2018

(54) DEVICE FOR THERMOKINETIC PROPERTY MEASUREMENT

(71) Applicant: Council of Scientific & Industrial Research, New Delhi (IN)

(72) Inventor: Amol Arvind Kulkarni, Maharashtra (IN)

(73) Assignee: Council of Scientific & Industrial Research, New Delhi (IN)

(*) Notice: Subject to any disclaimer, the term of this patent is extended or adjusted under 35 U.S.C. 154(b) by 497 days.

(21) Appl. No.: 14/413,211

(22) PCT Filed: Jul. 8, 2013

(86) PCT No.: PCT/IN2013/000419
§ 371 (c)(1),
(2) Date: Jan. 6, 2015

(87) PCT Pub. No.: WO2014/006641
PCT Pub. Date: Jan. 9, 2014

(65) Prior Publication Data
US 2015/0139269 A1    May 21, 2015

(30) Foreign Application Priority Data
Jul. 6, 2012    (IN) .......................... 2105/DEL/2012

(51) Int. Cl.
*G01K 17/04*    (2006.01)
*G01K 13/02*    (2006.01)
*G01K 17/00*    (2006.01)

(52) U.S. Cl.
CPC .................. *G01K 17/00* (2013.01)

(58) Field of Classification Search
CPC ............ B01F 15/00396; B01J 19/0006; B01J 19/0013; B01J 19/0046; B01J 2219/002;
(Continued)

(56) References Cited

U.S. PATENT DOCUMENTS 3,726,644 A    4/1973  Desnoyers et al.
4,963,499 A *  10/1990  Stockton ............ G01N 25/4846
                                                    165/263

(Continued)

OTHER PUBLICATIONS

Wang, K. et al. 2009 "Measuring enthalpy of fast exothermal reaction with micro-reactor-based capillary calorimeter", *AIChe Journal* 56(4); 1045-1052.

*Primary Examiner* — Gail Kaplan Verbitsky
(74) *Attorney, Agent, or Firm* — Knobbe, Martens, Olson & Bear, LLP

(57) ABSTRACT

A device which can be used as a flow reactor for synthesis and for discerning the reaction kinetics as well as a flow calorimeter is a need in the art. To fulfill this need, the invention discloses a simple calorimeter that functions as a device to measure reaction kinetics, preferably heat of reaction in a continuous manner, in adiabatic as well as in isothermal conditions. The distinct advantages of the device include online determination of thermokinetic properties, continuous determination of thermokinetic properties and applicable for determination in adiabatic as well as isothermal modes. The device may function independently or may be used in combination with reactors, micro reactors or tubular reactors.

14 Claims, 4 Drawing Sheets

(58) Field of Classification Search
CPC .... B01J 2219/00283; B01J 2219/00495; B01J 2219/00704; G01K 17/00; G01K 13/02; G01K 17/04; E21B 47/06; G01N 25/18; G01N 29/02
USPC ........................................................ 436/147
See application file for complete search history.

(56) References Cited

U.S. PATENT DOCUMENTS

| | | | | |
|---|---|---|---|---|
| 5,346,306 A | * | 9/1994 | Reading | G01N 25/18 374/10 |
| 6,953,280 B2 | * | 10/2005 | Fischer | G01K 17/00 374/31 |
| 7,021,820 B2 | * | 4/2006 | Chippett | G01K 17/00 374/33 |

* cited by examiner

DEVICE FOR THERMOKINETIC PROPERTY MEASUREMENT

TECHNICAL FIELD OF THE INVENTION

Present invention relates to a device for thermokinetic property measurement. Particularly, present invention relates to a calorimeter useful as a device for the measurement of thermo kinetic properties. More particularly, present invention relates to a continuous flow device that measures the heat of reaction on a continuous basis.

BACKGROUND AND PRIOR ART OF THE INVENTION

Batch mode of reactions is followed widely, though conversion to continuous mode may be desirable in many cases. In batch mode of reactions, monitoring of reaction parameters such as heat transfer is carried out at the beginning and end of the reaction using batch mode calorimeters. Sampling during reaction is not possible.

Continuous flow synthesis has become an accepted approach for the synthesis of chemicals which were otherwise difficult to synthesize in conventional manner. The large heat transfer area per unit volume helps to carry out fast and exothermic reactions in a reliable manner. The same approach can be used to extract important features about the reaction viz. reaction rate constants, activation energy and also to some extent the thermodynamic parameters. However, to achieve this objective, it is necessary to have a compact and versatile device that can help to measure the reaction kinetics as well as heat of reaction in a quick manner.

Calorimeters that measure heat of reaction in batch reactions are marketed products. There are few reports in literature that attempt to measure heat of reaction and other thermokinetic properties in micro reactor based devices and processes and using LED display based calorimeters. But these prior art devices achieve measurement of thermokinetic properties at the beginning and end of reactions only, and are not designed to measure said properties in a continuous manner during the progress of a reaction.

WO2012097221 titled "System And Method For A Microfluidic Calorimeter" relates to a system for calorimetry comprising: a calorimetry apparatus comprising: a microfluidic laminar flow channel; at least two inlets in fluid connection with the laminar flow channel, the inlets allowing fluid to flow into the laminar flow channel; and a plurality of microscale temperature sensors disposed below the laminar flow channel at known positions relative to boundaries of the channel; and a processor in communication with the temperature sensors for calculating a calorimetry measurement based on local temperatures at the respective positions of the sensors in the channel derived based on data output by the microscale temperature sensors. The temperature sensors are nanohole arrays in a metal layer disposed below the laminar flow channel. But the drawback of this system is that it does not provide the extent of reaction progress at the point at which temperature is measured.

US2013121369 titled "Adiabatic Scanning Calorimeter" relates to an adiabatic scanning calorimeter for simultaneous measurements of the temperature dependence of heat capacity and enthalpy of liquids and solids and phase transitions, but the calorimenter does not have an option for monitoring the reaction and hence cannot be used to estimate the heat of reaction. It mainly functions as a temperature monitoring device. An article titled "Measuring enthalpy of fast exothermal reaction with micro-reactor-based capillary calorimeter" by K. wang, Y. C. Lu DOI: 10.1002/aic.11792 in AIChE Journal, Volume 56, Issue 4, pages 1045-1052, April 2010 discloses a new micro-reactor-based capillary calorimeter for the enthalpy measurement of fast exothermal reactions. The new calorimeter is operated in the continuous way. and the reaction enthalpy is measured with the online temperatures from detached sensor chips. A standard reaction system and an industrial reaction system are selected to test this new calorimeter with homogeneous and heterogeneous reaction processes. The measurement is taken at nearly adiabatic situations and the reaction enthalpy is calculated from the rising of temperature. High accuracy and good repeatability are obtained from this new calorimeter with relative experimental errors less than 3.5% and 2.4%, respectively. But this device may not be useful in isothermal conditions and the systems where phase change is possible. An other major drawback is that it does not track the reaction.

To overcome the drawbacks of the various cited devices and to provide a device which can be used as a flow reactor for synthesis and for discerning the reaction kinetics as well as as a flow calorimeter, the inventors disclose herein a calorimeter that functions as a device to measure reaction kinetics, preferably heat of reaction in a continuous manner, in adiabatic as well as in isothermal conditions. The device can be used independently for each of the above or simultaneously for any two or all of them together. Further, while the cited devices may measure the heat of reaction, none of the prior art devices can monitor the progress of the reaction continuously, which is necessary for the accuracy in the estimation of heat of reaction/dilution/dissolution/quenching With or without phase change during the reaction etc.

OBJECTS OF THE INVENTION

Main object of the present invention is to provide a calorimeter useful as a device for thermokinetic property measurement.

Another object of the present invention is to provide a continuous flow device to measure thereto kinetic properties in continuous manner.

Another object of the present invention is to provide a device that measures the heat of reaction independent of mode of measurement.

SUMMARY OF THE INVENTION

Accordingly, present invention provides a device for thermokinetic properly measurement to measure reaction kinetics, preferably heat of reaction in a continuous manner, in adiabatic as well as in isothermal conditions comprising a data management system (2) being connected. to a continuous flow and measurement section (3) and monitoring and processing unit (4) wherein said continuous flow and measurement section (3) further comprising a sectionalized jacket (301), the continuous flow sections for reaction mixture (304), assembly of four way thermally resistant connectors (305) for parallel flow of reaction mixture as well as the thermic fluid, inlet for the tube (307) carrying the reacting fluid, outlet for the tube (306) carrying the reacting fluid, inlet for the thermic fluid (302), outlet for the thermic fluid (303) wherein said assembly of four way thermally resistant connectors (305) for parallel flow of reaction mixture as well as thermic fluid (305) further comprising four way thermally resistant connectors (506), a temperature measurement device (501), a sealing section (502), outlet for withdrawing samples (504) regulated by a valve (503) for straight as well as coiled segment (304).

In an embodiment of the present invention, data management system (2) consisting a data acquisition system and a device to analyze the generated and acquired data.

In another embodiment of the present invention, temperature measurement device (501) used is selected from thermocouples, thermometers or IR sensors.

In yet another embodiment of the present invention, said temperature measurement device (501) is inserted through the tube wall at different spatial locations such that they touch the fluids flowing through the tube.

In yet another embodiment of the present invention, tubes (304) used is made out of metals, metal alloys, surface coated metallic tubes, polymeric tubes, and quartz tubes.

In yet another embodiment of the present invention, the cross section of the tubes (304) used is circular or cross-section made of straight edges viz. triangular, rectangular, pentagonal and hexagonal.

In yet another embodiment of the present invention, said device functions independently, as a standalone device or in combination with reactors, micro reactors or tubular reactors.

In yet another embodiment of the present invention, temperature at different locations was monitored online while the samples collected at different ports using different online (UV-Vis Spectrophotometer, IR probes and off-line (Gas Chromatography, HPLC, UPLC, MS) analysis techniques.

In yet another embodiment of the present invention, the acquisition of the measured temperature can be done through thermocouples through the wired or wireless data acquisition system.

In yet another embodiment of the present invention, said device measure reaction kinetics by using known method.

DETAILED DESCRIPTION OF THE INVENTION

Figure 1:
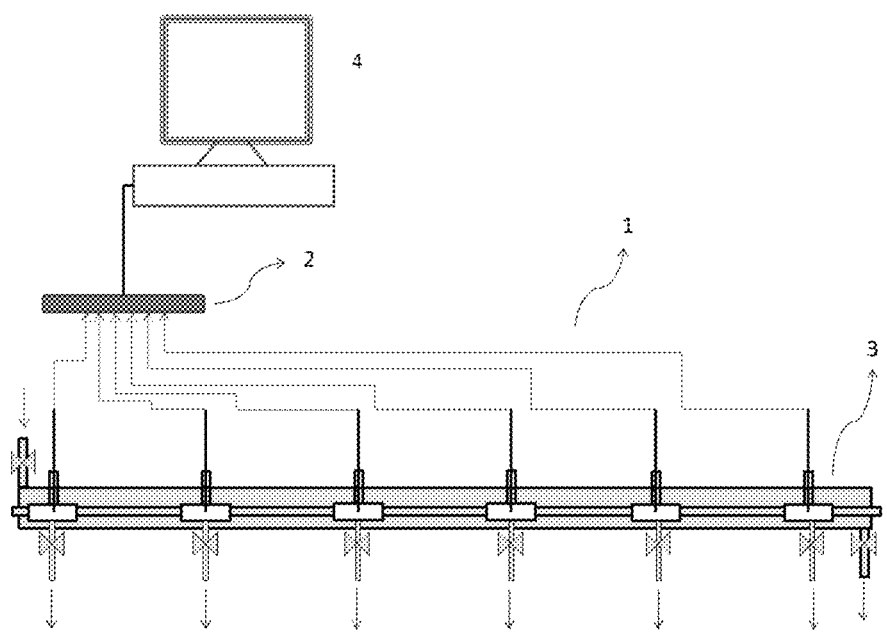
FIG. 1 represents schematic of the device (1) showing the assembly of thermokinetic property measurement system comprising of data. management system (2), the continuous flow and measurement section (3) and the monitoring and processing unit (4).

The present invention brings out a device which can be used as a flow reactor for synthesis and for discerning the reaction kinetics as well as a flow calorimeter. The device can be used independently for each of the above or simultaneously for any two or all of them together.

A calorimeter that functions as a device to measure reaction kinetics, preferably heat of reaction in a continuous manner, in adiabatic as well as in isothermal conditions comprising a data acquisition system (2), continuous flow and measurement section (3) and monitoring and processing unit (4), said continuous flow and measurement section comprising a sectionalized jacket made from thermally resistant material (301), the continuous flow sections for reaction mixture (304), assembly of four way thermally resistant connectors for parallel flow of reaction mixture as well as thermic fluid (305), inlet for the tube carrying the reacting fluid (307), outlet for the tube carrying the reacting fluid (306), inlet for the thermic fluid (302), outlet for the thermic fluid (303) is disclosed herein.

The invention discloses a calorimeter that functions as a device to measure reaction kinetics, preferably heat of reaction/dilution/dissolution/quenching etc. with or without phase change in a continuous manner, in adiabatic as well as in isothermal conditions comprising data acquisition system (2), continuous flow and measurement section (3) and monitoring and processing unit (4), said continuous flow and measurement section comprising a sectionalized jacket made from thermally resistant material (301), the continuous flow sections for reaction mixture (304), assembly of four way thermally resistant connectors for parallel flow of reaction mixture as well as thermic fluid (305), inlet for the tube carrying the reacting fluid (307), outlet for the tube carrying the reacting fluid (306), inlet for the thermic fluid (302) and outlet for the thermic fluid (303).

The invention discloses a device for measurement of thermo kinetic properties comprising a tube (304) attached to the inlet of the thermostatic fluid of the reactor, a tube attached to the outlet of the fluid, at least one sampling port with a thermometer sensing device (viz. thermocouples, thermometers, IR probes) and a data management system to manage the temperature measurement and data generated by the device. The data management system further comprises a data acquisition system and a device, which uses the local temperature vs. time data for exploring the steady state features for reliable estimation of the heat of reaction, continuously. The spatiotemporal temperature data upon achieving the steady state was integrated over length and combined with the local composition using equation 2 to analyse the generated and acquired data. (refer FIG. 1).

Temperature data acquisition system (2) that uses the inputs from thermocouples in terms of electric signal is converted in the form of temperature.

The assembly of four way thermally resistant connectors (305) for parallel flow of reaction mixture as well as thermic fluid comprises four way thermally resistant connectors (506) for parallel flow of reaction mixture as well as the thermic fluid (305) comprising of a thermocouple (501), a sealing section (502), outlet for withdrawing samples (504) regulated by a valve (503) for straight as well as coiled (304) segment.

The enthalpies were estimated from the energy conservation in the system. Since the system can be maintained adiabatic as well as isothermal the energy conservation can be used to estimate the heat of dilution, dissolution, reaction etc. depending upon the mode of operation. For the case where the system is completely insulated, the reaction will take place at nearly adiabatic condition. The heat released from the reaction is transformed to the thermal energy thereby increasing the temperature of the reaction system. Since the tube material as well as the insulating material would have some heat capacity, there will be a finite loss of heat to them during the operation. These issues can be taken into account to establish a complete heat balance in the reactor system.

Figure 2:
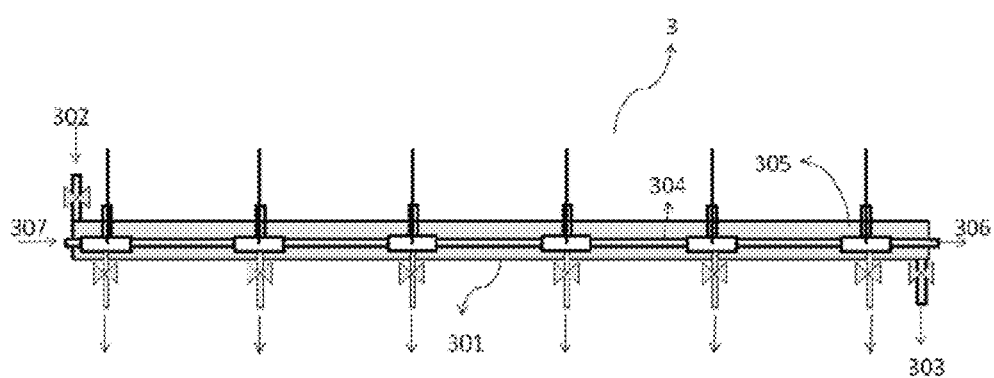
FIG. 2 represents the details of the the continuous flow and measurement section (3) comprising of a sectionalized jacket made from thermally resistant material (301), the continuous flow sections for reaction mixture (304), assembly of four way thermally resistant connectors (305) for parallel flow of reaction mixture as well as the thermic fluid, inlet for the tube (307) carrying the reacting fluid, outlet for the tube (306) carrying the reacting fluid, inlet for the thermic fluid (302), outlet for the thermic fluid (303).
Figure 3:
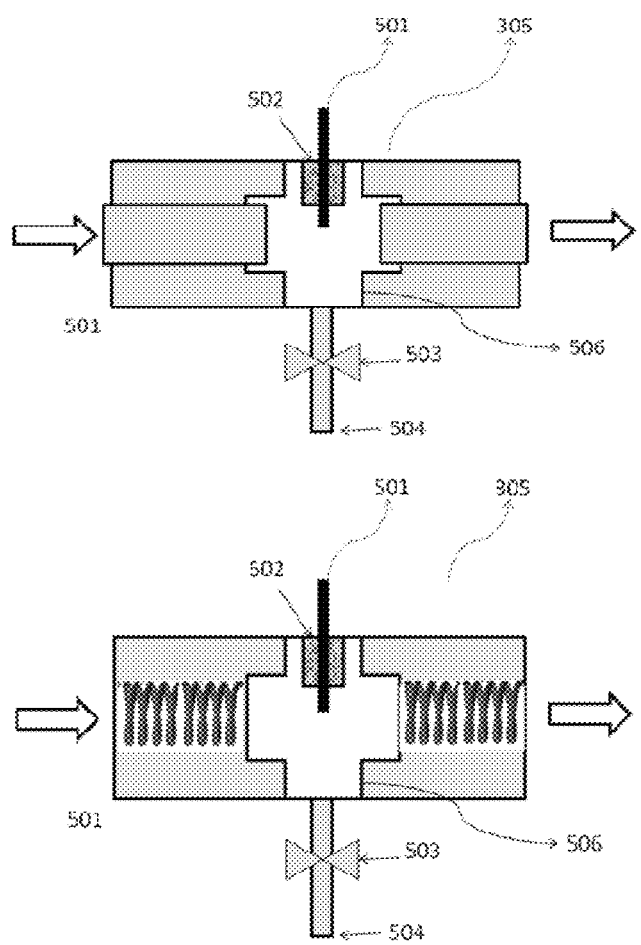
FIG. 3 represents the assembly of the four way thermally resistant connectors (305) for parallel flow of reaction mixture as well as the thermic fluid comprises of four way thermally resistant connectors (506), a thermocouple (501), a sealing section (502), outlet for withdrawing samples (504) regulated by a valve (503) for straight as well as coiled segment (304).
Figure 4:
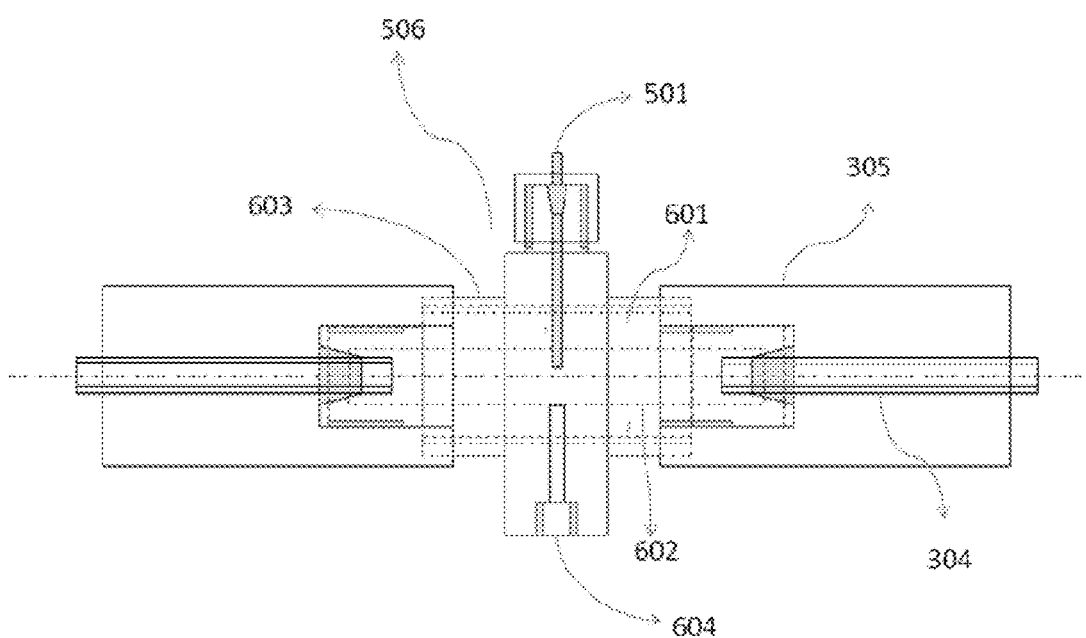
FIG. 4 shows the details of the four way thermally resistant connector (506) facilitated with threaded or tapered sleeves (603) for connecting to jacket (305) and a set of end to end bores (601) for flowing the thermic fluid from one jacket section to the next and the bore to flow the reactants through the reaction tubes (602) and a bore connecting the section carrying the reacting fluids to the sampling port (604).

The device (with reference to FIG. 2) comprises of a tube (304) (having circular cross-section or cross-section made of straight edges viz. triangular, rectangular, pentagonal and hexagonal etc.) of any material (metal, alloys, polymeric, polymer composites, ceramic etc.) either in straight form of helical coil or spiral shape. Temperature measurement device (thermocouples, thermometers, IR probes) is inserted through the tube wall at different spatial locations such that they touch the fluids flowing through the tube. The locations of insert are made leak proof by using leak proof sealing. At the points of insert the tube has a port, which can act as an outlet or sampling port using a On-Off valve. The reacting/dissolving mixture enters the tube at the inlet. The fluids can be injected using any suitable dosing system viz. syringe pump for dosing liquid and a mass flow controlled gas supply from a gas cylinder.

The temperature at different locations was monitored online. The other ports at the locations where the local temperature is measured are used for taking the local reaction mixture sample to measure the composition. The extent of conversion or dissolution could be measured. This can be clone online using an online UV-Vis spectrophotometer or off-line sample analysis.

The following set of equations are used for the estimation of local enthalpy $$\Delta H_r = \frac{Q_L + \Delta H}{n}$$

Where $Q_L$ is the thermal loss in the system, $\Delta H$ is the enthalpy rise in the system due to chemical/physical transformation and n is the number of moles. $\Delta H$ is estimated as $$\Delta H = \int_{T_{in}}^{T_{max}} \int_i m_i Cp_i dT$$

where $m_i$ is mass flow rate of materials, $Cp_i$ is the specific heat capacity.

The device of the invention for measuring thermo kinetic properties functions independently, as a standalone device.

The device functions in combination with reactors, micro reactors or tubular reactors. Device may be connected to systems that function as reactors and also provide data with regard to various reaction parameters.

EXAMPLES

Following examples are given by way of illustration therefore should not be construed to limit the scope of the invention.

Example 1

The flow reaction calorimeter comprised of sections of specific length of polytetrafluoroethylene (PTFE) tubes connected to four-way connectors. While two opposite ports of the four-way connectors were used for connecting the tube, the other two opposite ports were connected to thermocouple and to the sample withdrawal section, respectively. Four such ports were used to measure the local temperature at four different locations along the length of tube. Water and concentrated sulfuric acid were dosed independently using syringe pumps. Residence time of liquids was varied in the range of 60 s to 300 s for the total volume of 1.4 ml of the tubular reactor. The entire system was insulated to avoid any heat loss. The losses were estimated using hot water at different flow rates and temperatures. Initial fluid temperature was 27° C. For a residence time of 60 s, the temperature at first thermocouple resulted in 114.2° C. while the temperature at the second and third thermocouple showed temperature of 102.3° C. and 70.6° C., respectively. From the data of mass flow rates, temperature difference and the estimated thermal loss the value of heat of dissolution was estimated and was 451.83 J/g.

Example 2

For the set-up explained in Example 1, when equal moles of sulfuric acid and sodium hydroxide were pumped separately and mixed, the temperature at the mixing point, the thermocouple alter 23 cm and 78 cm respectively rises to 31.8° C., 37.3° C. and 37.6° C., respectively. The estimated heat of neutralization comes to −59.42 J/g (±1.67%).

Example 3

For the set-up explained in Example 1, when equal moles of nitrating mixture and bromobenzene in acetic acid were pumped separately and mixed. The estimated heat of neutralization comes to −86.73 kJ/mol.

Example 4

For the set-up explained in Example 1, when equal moles of fuming nitric acid and acetophenone were pumped separately and mixed to react. The estimated heat of neutralization comes to −137 kJ/mol. With nitrating mixture the value comes to −189 kJ/mol.

Example 5

The flow reaction calorimeter comprised of sections of specific length of stainless steel (SS316) tubes connected to PTFE (polytetrafluoroethylene) four-way connectors having independent and parallel bores for flow of reacting fluids and the heat transfer fluid. Remaining two bores acted as ports for thermocouple and to the sample withdrawal section, respectively. Four such ports were used to measure the local temperature at four different locations along the length of tube. Fuming nitric acid and water were passed through the inlet of reacting channel [104] while water at ambient condition was used as the heat transfer fluid flowing through the jacket [305] made out of a thermally resistant material. At steady state, temperature was measured at different ports and samples were withdrawn to check the extent of dilution. Residence time of liquids was varied in the range of 20 s to 60 s for the total volume of 28 ml of the tubular reactor. The rise in the temperature in the water through jacket was monitored and used for the estimation of losses. Inlet fluid temperature was 25° C. For a residence time of 15 s, 30 s, 45 s and 60 s, the temperature at the respective thermocouples resulted in steady state values of 34° C., 46° C., 29° C. and 26° C., respectively. The extent of dilution at different residence times varied as 56%, 75%, 89% and 100%, respectively. From the data of mass flow rates, temperature difference and the estimated thermal loss the value of heat of dissolution was estimated and was 114.9 kJ/kg.

Example 6

Using the system described in Example 5 with a PTFE tube for flowing the reaction mixture, the apparatus was used for the measurement of heat of reaction between sodium hydroxide and ethyl acetate. Temperature of the reactants at the inlet was 20° C. and the residence time in the device was 10 minutes. At steady state, temperature was measured at different ports and samples were withdrawn to check the reaction progress. The jacket was kept empty and was connected to vacuum line to avoid any losses and operate the system at adiabatic condition. Samples were withdrawn from different outlets and analyzed. The temperature data at each position was monitored and used for the estimation of heat of reaction. The known value of the heat of reaction for this system is −73.9 kJ/mol. With reaction remaining incomplete event at the final outlet, the estimated heat of reaction based on the temperature rise alone (and the specific heat capacities of the reactants) varied between 77% to 85% of the known data depending upon the location of temperature data. Upon estimating the heat of reaction by knowing the exact composition of the reaction mixture at the point of temperature measurement, the estimated values varied in the range of 97-98.5% of the known values.

Advantages of the Invention

1. Online determination of thereto kinetic properties possible.
2. Continuous determination of thermo kinetic properties possible.
3. Applicable for determination in adiabatic as well as isothermal modes.

What claimed is:

1. A device for thermokinetic property measurement to measure reaction kinetics in adiabatic as well as in isothermal conditions comprising a data management system being connected to a continuous flow and a measurement section and a monitoring and processing unit, wherein said continuous flow and the measurement section further comprises a sectionalized jacket, continuous flow sections for a reaction mixture, an assembly of four way thermally resistant connectors for parallel flow of the reaction mixture as well as a thermic fluid, an inlet for a tube carrying the reaction mixture, an outlet for the tube carrying the reaction mixture, an inlet for a thermic fluid, an outlet for the thermic fluid wherein said assembly of four way thermally resistant connectors for parallel flow of the reaction mixture as well as the thermic fluid further comprises four way thermally resistant connectors, a temperature measurement device to measure at least one thermokinetic property of the reaction mixture and cause measurement of reaction-kinetics by the data management system, a sealing section, an outlet for withdrawing at least the reaction mixture samples regulated by a valve.

2. The device as claimed in claim 1, wherein data management system comprises a data acquisition system and a device to analyze generated and acquired data.

3. The device as claimed in claim 1, wherein temperature measurement device used is selected from the group consisting of thermocouples, thermometers and IR sensors.

4. The device as claimed in claim 1, wherein said temperature measurement device is inserted through a tube wall at different spatial locations such that it contacts reaction mixture and thermic fluids flowing through the tube.

5. The device as claimed in claim 1, wherein the continuous flow sections are made out of metals, metal alloys, surface coated metallic tubes, polymeric tubes, and/or quartz tubes.

6. The device as claimed in claim 1, wherein the cross section of the continuous flow sections is circular or a cross-section made of straight edges.

7. The device as claimed in claim 1, wherein said device functions independently, as a standalone device or in combination with reactors, micro reactors or tubular reactors.

8. A method of measuring reaction kinetics, comprising
flowing the reaction mixture through the tube of the device as claimed in claim 1,
monitoring, during the reaction, a temperature of the tube at different locations,
collecting samples at the outlet, and
analyzing the samples during and after the reaction.

9. The device as claimed in claim 1, wherein an acquisition of the measured temperature is done by the temperature measurement device through wired or wireless data acquisition system(s), wherein the temperature measurement device is a thermocouple.

10. A method of measuring reaction kinetics, comprising
flowing the reaction mixture through the tube of the device as claimed in claim 1,
measuring thermokinetic properties of a reaction occurring in the reaction mixture at least through the temperature-measurement device, and
determining reaction kinetics of said reaction from said thermokinetic properties at-least based on the data management system.

11. The device of claim 1, wherein said reaction kinetics and heat of reaction are determined during the reaction.

12. The device as claimed in claim 6, wherein said cross section made of straight edges is selected from the group consisting of triangular, rectangular, pentagonal and hexagonal.

13. The method of claim 8, wherein techniques for analysis during the reaction are selected from the group consisting of UV-Vis Spectrophotometry and IR Spectroscopy.

14. The method of claim 8, wherein techniques for analysis after the reaction are selected from the group consisting of Gas Chromatography, high performance liquid chromatography (HPLC), ultra performance liquid chromatography (UPLC), and mass spectrophotometry (MS).

* * * * *